(12) United States Patent
Richeson et al.

(10) Patent No.: US 8,406,168 B2
(45) Date of Patent: Mar. 26, 2013

(54) ASYMMETRIC BROADBAND DATA RADIO NETWORK

(75) Inventors: Steven D. Richeson, Brighton, NY (US); Jay C. Adrick, Cincinnati, OH (US)

(73) Assignee: Harris Corporation, Melbourne, FL (US)

( * ) Notice: Subject to any disclaimer, the term of this patent is extended or adjusted under 35 U.S.C. 154(b) by 648 days.

(21) Appl. No.: 12/403,594

(22) Filed: Mar. 13, 2009

(65) Prior Publication Data

US 2010/0232355 A1    Sep. 16, 2010

(51) Int. Cl.
H04W 84/10     (2009.01)
(52) U.S. Cl. .......................................... 370/328
(58) Field of Classification Search .................. 370/328, 370/338, 332
See application file for complete search history.

(56) References Cited

U.S. PATENT DOCUMENTS

| | | | |
|---|---|---|---|
| 4,845,504 | A | 7/1989 | Roberts et al. |
| 4,852,086 | A | 7/1989 | Eastmond et al. |
| 4,955,083 | A | 9/1990 | Phillips et al. |
| 5,265,264 | A | 11/1993 | Dzung et al. |
| 5,479,480 | A | 12/1995 | Scott |
| 5,790,527 | A | 8/1998 | Janky et al. |
| 5,805,645 | A | 9/1998 | Przelomiec et al. |
| 5,862,486 | A | 1/1999 | Przelomiec |
| 5,870,149 | A | 2/1999 | Comroe et al. |
| 5,915,212 | A | 6/1999 | Przelomiec et al. |
| 5,930,723 | A | 7/1999 | Heiskari et al. |
| 5,995,515 | A | 11/1999 | Suzuki |
| 6,002,941 | A | 12/1999 | Ablay et al. |
| 6,009,553 | A | 12/1999 | Martinez et al. |
| 6,023,626 | A | 2/2000 | Kinnunen et al. |

(Continued)

FOREIGN PATENT DOCUMENTS

| | | |
|---|---|---|
| EP | 0 848 565 A2 | 6/1998 |
| EP | 1 612 996 A1 | 1/2006 |

(Continued)

OTHER PUBLICATIONS

Software-Enabled Wireless Interoperability Assessment Report—Voice-over-IP Technology, Dec. 2001, www.safecomprogram.Igov/NR/rdonlyres/63893E23__C4EE-4779-BB91-600847499056/0/voip_technolgy_assessment.pdf.

(Continued)

*Primary Examiner* — Mark Rinehart
*Assistant Examiner* — Mohammad Anwar
(74) *Attorney, Agent, or Firm* — Fox Rothschild, LLP; Robert J. Sacco

(57) ABSTRACT

An asymmetric wireless network (100) includes a first base station (104) including a RF transceiver (208) having a first transmission range, a first transmit data rate, and a first coverage area. The wireless network also includes a second base station (106) comprising a RF transmitter (210) having a second transmission range, a second transmit data rate, and a second coverage area. In the wireless network, the second transmit data rate is greater than the first transmit data rate, the first and the second transmission ranges are substantially equal, and the first and the second coverage areas at least partially overlap. The wireless network also includes at least one computer network (108) communicatively coupling the base stations, configured for generating transmit data in response to a data request received at the first base station, and configured for routing the transmit data to the first or the second base station for transmission.

24 Claims, 6 Drawing Sheets

U.S. PATENT DOCUMENTS

| | | |
|---|---|---|
| 6,035,196 A | 3/2000 | Hengeveld et al. |
| 6,041,048 A | 3/2000 | Erickson et al. |
| 6,084,919 A | 7/2000 | Kleider et al. |
| 6,144,647 A | 11/2000 | Lopez-Torres |
| 6,163,710 A | 12/2000 | Blaser et al. |
| 6,215,778 B1 | 4/2001 | Lomp et al. |
| 6,253,082 B1 | 6/2001 | Hengeveld |
| 6,301,263 B1 | 10/2001 | Maggenti |
| 6,351,653 B1 | 2/2002 | Alberth, Jr. et al. |
| 6,373,828 B1 | 4/2002 | Stewart et al. |
| 6,373,946 B1 | 4/2002 | Johnston |
| 6,449,491 B1 | 9/2002 | Dailey |
| 6,477,150 B1 | 11/2002 | Maggenti et al. |
| 6,515,997 B1 | 2/2003 | Feltner et al. |
| 6,549,587 B1 | 4/2003 | Li |
| 6,591,084 B1 | 7/2003 | Chuprun et al. |
| 6,611,536 B1 | 8/2003 | Ahmed |
| 6,757,266 B1 | 6/2004 | Hundscheidt |
| 6,775,337 B2 | 8/2004 | Janky et al. |
| 6,788,946 B2 | 9/2004 | Winchell et al. |
| 6,826,414 B1 | 11/2004 | Reynolds et al. |
| 6,831,903 B2 | 12/2004 | Kang |
| 6,865,372 B2 | 3/2005 | Mauney et al. |
| 6,912,387 B2 | 6/2005 | Haas et al. |
| 6,928,067 B1 | 8/2005 | Hameleers et al. |
| 6,928,294 B2 | 8/2005 | Maggenti et al. |
| 6,937,589 B2 | 8/2005 | Taketsugu |
| 7,031,286 B1 | 4/2006 | Hall et al. |
| 7,050,786 B2 | 5/2006 | Caci |
| 7,050,787 B2 | 5/2006 | Caci |
| 7,061,894 B2 | 6/2006 | Pang et al. |
| 7,065,058 B1 | 6/2006 | Korus |
| 7,079,857 B2 | 7/2006 | Maggenti et al. |
| 7,130,282 B2 | 10/2006 | Black |
| 7,149,552 B2 | 12/2006 | Lair |
| 7,218,630 B1* | 5/2007 | Rahman .................... 370/355 |
| 7,221,660 B1 | 5/2007 | Simonson et al. |
| 7,239,867 B2 | 7/2007 | Kotzin et al. |
| 7,245,927 B2 | 7/2007 | Hansen |
| 7,250,830 B2 | 7/2007 | Layne et al. |
| 7,305,240 B2* | 12/2007 | Chou et al. .................. 455/450 |
| 7,307,963 B2 | 12/2007 | Chow et al. |
| 7,333,829 B2* | 2/2008 | Malone et al. ............. 455/552.1 |
| 7,443,965 B2 | 10/2008 | Blossom et al. |
| 7,460,510 B2 | 12/2008 | Olivier et al. |
| 7,483,416 B2 | 1/2009 | Olivier et al. |
| 7,489,698 B2 | 2/2009 | Blossom et al. |
| 7,492,734 B2 | 2/2009 | Mathis et al. |
| 7,492,737 B1 | 2/2009 | Fong et al. |
| 7,864,725 B2 | 1/2011 | Li et al. |
| 2001/0046214 A1 | 11/2001 | Kang |
| 2002/0086665 A1 | 7/2002 | Maggenti et al. |
| 2002/0086701 A1 | 7/2002 | Salmi et al. |
| 2002/0093928 A1 | 7/2002 | LoGalbo et al. |
| 2002/0101859 A1 | 8/2002 | Maclean |
| 2002/0115475 A1 | 8/2002 | Abrol et al. |
| 2002/0151321 A1 | 10/2002 | Winchell et al. |
| 2002/0161841 A1 | 10/2002 | Kinnunen |
| 2002/0196781 A1 | 12/2002 | Salovuori |
| 2003/0012217 A1 | 1/2003 | Andersson et al. |
| 2003/0053434 A1 | 3/2003 | Chow et al. |
| 2003/0058827 A1 | 3/2003 | Chow et al. |
| 2003/0119498 A1 | 6/2003 | Haas et al. |
| 2003/0134638 A1 | 7/2003 | Sundar et al. |
| 2003/0148785 A1 | 8/2003 | Mangal et al. |
| 2003/0156578 A1 | 8/2003 | Bergenlid et al. |
| 2003/0169768 A1 | 9/2003 | Bienn et al. |
| 2003/0177245 A1 | 9/2003 | Hansen |
| 2003/0189950 A1 | 10/2003 | Spear et al. |
| 2003/0190932 A1 | 10/2003 | Pulkkinen et al. |
| 2003/0198198 A1 | 10/2003 | Echavarri et al. |
| 2004/0032843 A1 | 2/2004 | Schaefer et al. |
| 2004/0121729 A1 | 6/2004 | Herndon et al. |
| 2004/0121781 A1 | 6/2004 | Sammarco |
| 2004/0190468 A1 | 9/2004 | Saijonmaa |
| 2004/0196861 A1 | 10/2004 | Rinchiuso et al. |
| 2004/0202940 A1 | 10/2004 | Kramer et al. |
| 2004/0203938 A1* | 10/2004 | Kulkarni .................... 455/464 |
| 2005/0058136 A1 | 3/2005 | Lothberg et al. |
| 2005/0070280 A1 | 3/2005 | Jung et al. |
| 2005/0073964 A1 | 4/2005 | Schmidt et al. |
| 2005/0078627 A1 | 4/2005 | Yoon et al. |
| 2005/0135348 A1 | 6/2005 | Staack |
| 2005/0143056 A1 | 6/2005 | Iyer et al. |
| 2005/0157673 A1 | 7/2005 | Verma et al. |
| 2005/0159107 A1 | 7/2005 | Mauney et al. |
| 2005/0176473 A1 | 8/2005 | Melpignano |
| 2005/0180418 A1 | 8/2005 | Andersen et al. |
| 2005/0197101 A1 | 9/2005 | Gupta |
| 2005/0232241 A1 | 10/2005 | Wu et al. |
| 2005/0233776 A1 | 10/2005 | Allen et al. |
| 2005/0243785 A1 | 11/2005 | Sabat et al. |
| 2005/0243857 A1 | 11/2005 | Hofstaedter et al. |
| 2006/0002372 A1 | 1/2006 | Smith |
| 2006/0013191 A1 | 1/2006 | Kavanagh |
| 2006/0035669 A1 | 2/2006 | Chuprun et al. |
| 2006/0077924 A1 | 4/2006 | Rune |
| 2006/0084457 A1 | 4/2006 | Laha et al. |
| 2006/0089180 A1 | 4/2006 | Salmi |
| 2006/0092865 A1 | 5/2006 | Williams |
| 2006/0104293 A1 | 5/2006 | Kopp et al. |
| 2006/0114890 A1 | 6/2006 | Martin Boys |
| 2006/0126635 A1 | 6/2006 | Alberth et al. |
| 2006/0141939 A1* | 6/2006 | Nakada ...................... 455/69 |
| 2006/0145781 A1 | 7/2006 | Layne et al. |
| 2006/0147008 A1 | 7/2006 | Blossom et al. |
| 2006/0171307 A1* | 8/2006 | Gopalakrishnan et al. ... 370/229 |
| 2006/0193295 A1 | 8/2006 | White et al. |
| 2006/0205398 A1 | 9/2006 | Seckendorf et al. |
| 2006/0209828 A1 | 9/2006 | Ng et al. |
| 2006/0221968 A1 | 10/2006 | Razdan et al. |
| 2006/0234762 A1 | 10/2006 | Ozluturk |
| 2006/0245425 A1 | 11/2006 | Mathis et al. |
| 2006/0262800 A1 | 11/2006 | Martinez et al. |
| 2006/0280144 A1 | 12/2006 | Kangas |
| 2006/0281471 A1 | 12/2006 | Shaffer et al. |
| 2007/0037596 A1 | 2/2007 | Shaffer et al. |
| 2007/0049314 A1* | 3/2007 | Balachandran et al. ...... 455/518 |
| 2007/0072554 A1 | 3/2007 | Janky |
| 2007/0081637 A1 | 4/2007 | Beard et al. |
| 2007/0153789 A1 | 7/2007 | Barker et al. |
| 2007/0173222 A1 | 7/2007 | Hansen |
| 2007/0201432 A1 | 8/2007 | Sood et al. |
| 2007/0207731 A1 | 9/2007 | Hansen |
| 2007/0242670 A1 | 10/2007 | Simonson et al. |
| 2007/0291744 A1 | 12/2007 | Lundberg et al. |
| 2008/0031207 A1 | 2/2008 | Martinez et al. |
| 2008/0031275 A1 | 2/2008 | Janky et al. |
| 2008/0075055 A1 | 3/2008 | Chow et al. |
| 2008/0146221 A1 | 6/2008 | Noldus |
| 2008/0159128 A1 | 7/2008 | Shaffer et al. |
| 2008/0175263 A1 | 7/2008 | Chen et al. |
| 2008/0205321 A1 | 8/2008 | Martinez |
| 2008/0214232 A1* | 9/2008 | Ozluturk .................... 455/552.1 |
| 2008/0218427 A1 | 9/2008 | Dobosz et al. |
| 2008/0298293 A1 | 12/2008 | Hiben et al. |
| 2008/0299942 A1 | 12/2008 | Goulder et al. |
| 2008/0317066 A1 | 12/2008 | Trine et al. |
| 2009/0005100 A1 | 1/2009 | Copeland |
| 2009/0024845 A1 | 1/2009 | Benshetler et al. |
| 2009/0138563 A1* | 5/2009 | Zhu et al. ...................... 709/206 |
| 2009/0215411 A1 | 8/2009 | Tucker et al. |

FOREIGN PATENT DOCUMENTS

| | | |
|---|---|---|
| EP | 1612996 A1 | 1/2006 |
| GB | 2315193 | 1/1998 |
| WO | WO-95/23485 A1 | 8/1995 |
| WO | WO-98 57482 A1 | 12/1998 |
| WO | WO 98/57482 A1 | 12/1998 |
| WO | 01 52563 A2 | 7/2001 |
| WO | WO-2005/039112 | 4/2005 |

OTHER PUBLICATIONS

"The Authoritative Dictionary of IEEE Standard Terms", Standards Information Network IEEE Press, Seventh Edition, p. 378.

Ericsson: "Communication and Information Services for National Security and Public Safety", White Paper, [online] Apr. 2005, pp. 1-25, XP002397357.

M/A COM, Inc., VIDA Network Solutions—The IP Network Approach to Your Critical Communications, [online], May 18, 2004, pp. 1-8, XP-002619659, [retrieved on Feb. 1, 2011]. Retrieved from the Internet: <URL:http://www.racom.net/Downloads/VIDA_Brochure.pdf>.

Extended European Search Report mailed Mar. 3, 2011, European Application No. 10015389.9-1249, in the name of Pine Valley Investments, Inc.

M/A Com Inc.: "P25IP—Expanding Digital Communications", May 18, 2004, pp. 1-4, XP002619660, Retrieved from the Internet: URL:http://www.racom.net/Downloads/P24_Brochure.pdf [retrieved on Feb. 1, 2011].

Pine Valley Investments, Inc., European Search Report mailed Feb. 24, 2011 in European Application Serial No. EP 10015388.1.

Information about Related Patents and Patent Applications, seeing Section 6 of the accompanying Information Disclosure Statement Letter, which concerns Related Patents and Patent Applications, May 17, 2005, Jun. 24, 2005, Aug. 7, 2006, Mar. 13, 2009.

Whitepaper, Mobitv, "ATSC-M/H: The Promise of Free to Air Mobile Simulcast" found at <<http://www.mobitv.com/technology/whitepapers/ATSC.PDF>> on Mar. 13, 2009.

\* cited by examiner

100

200

300

400

600

ASYMMETRIC BROADBAND DATA RADIO NETWORK

FIELD OF THE INVENTION

The invention relates to wireless data networks, and more specifically to an asymmetric wireless broadband data network.

BACKGROUND

Many public safety departments now use mobile data networks to provide computer automated dispatch (CAD) services, autonomous vehicle location (AVL) systems, database queries, and photo ID information. The use of such services not only ensures the accurate and reliable exchange of information, but has significantly reduced or eliminated the amount of voice chatter in public safety voice channels and improved access of such voice channels during emergency situations.

However, conventional mobile data services are generally provided by private low speed networks operating in the public safety bands at data rates between 9.2 and 64 kb/s for CAD and AVL systems. Although these systems generally work well for law enforcement, first responder, and other public safety operations, the limited bandwidth of such systems generally cannot support advanced applications such as video streaming and the rapid transmission of large data files. As a result, some advanced applications such as electronic warrants, biometric information, hot list updates, and video communications are generally unavailable or cannot be used in real-time.

In some cases, public safety departments have obtained larger bandwidth data channels by the use unlicensed bands or public cellular networks. However, since these networks provide data services in cells with ranges from a few hundred feet to several miles, and are designed to support consumer grade services to a very large number of customers, these unlicensed and public networks generally do not provide the reliability and isolation from overload that are required to enable the fully integrated use of CAD, AVL, and other advanced public safety applications. Additionally, public cellular networks operating on such standards as for example, CDMA-1X, UMTS/HSDPA, GSM/GPRS, TDMA/EDGE, EV/DO, are generally deployed to maximize capacity, at the expense of reach and reliability. Furthermore, use of such unlicensed and public networks by different departments generally limits the amount of interoperability.

SUMMARY

Embodiments of the invention provide systems and methods for implementing an asymmetric wireless broadband data network. In a first embodiment of the invention, an asymmetric wireless network is provided. The wireless network includes at least a first base station including a radio frequency (RF) transceiver having a first transmission range, a first transmit data rate, and a first coverage area. The wireless network also includes at least a second base station including a RF transmitter having a second transmission range, a second transmit data rate, and a second coverage area. In the wireless network, the second transmit data rate is greater than the first transmit data rate, the first and the second transmission ranges are substantially equal, and the first and the second coverage areas overlap at least partially. The wireless network also includes at least one computer network communicatively coupling the first and the second base stations, where the computer network is configured for generating transmit data in response to at least one data request received at the first base station, and routing the transmit data to at least one of the first and second base stations for transmission.

In a second embodiment of the invention, a method for exchanging data over an asymmetric wireless network is provided. The wireless network includes at least a first base station including a RF transceiver having a first transmission range, a first transmit data rate, and a first coverage area, at least a second base station includes a RF transmitter having a second transmission range, a second transmit data rate, and a second coverage area, and at least one computer network communicatively coupling the first and the second base stations. In the wireless network, the second transmit data rate is greater than the first transmit data rate, the first and the second transmission ranges are substantially equal, and the first and the second coverage areas are at least partially overlapping. The method includes the steps of receiving at least one data request at the first base station, generating transmit data in the computer network in response to the data request, and transmitting the transmit data using one of the first and second base stations.

In a third embodiment of the invention, a mobile station is provided. The mobile station includes a RF transceiver. The transceiver includes a transmitter for transmitting at least one data request to first base station and a receiver for receiving transmit data from at least one of the first base station associated with a first channel and a second base station associated with a second channel. The first base station is associated with a first transmit data rate and the second base station is associated with a second transmit data rate greater than the first transmit data rate. The mobile station also includes a processing element communicatively coupled to the transceiver. The processing element is configured for generating the data request and selecting one of the first and second channels for receiving the transmit data associated with the data request based on at least one of the data request, the quality of the communications link between the transceiver and the second base station, and a cue received by the transceiver identifying one of the first and second base stations.

DETAILED DESCRIPTION

Figure 1:
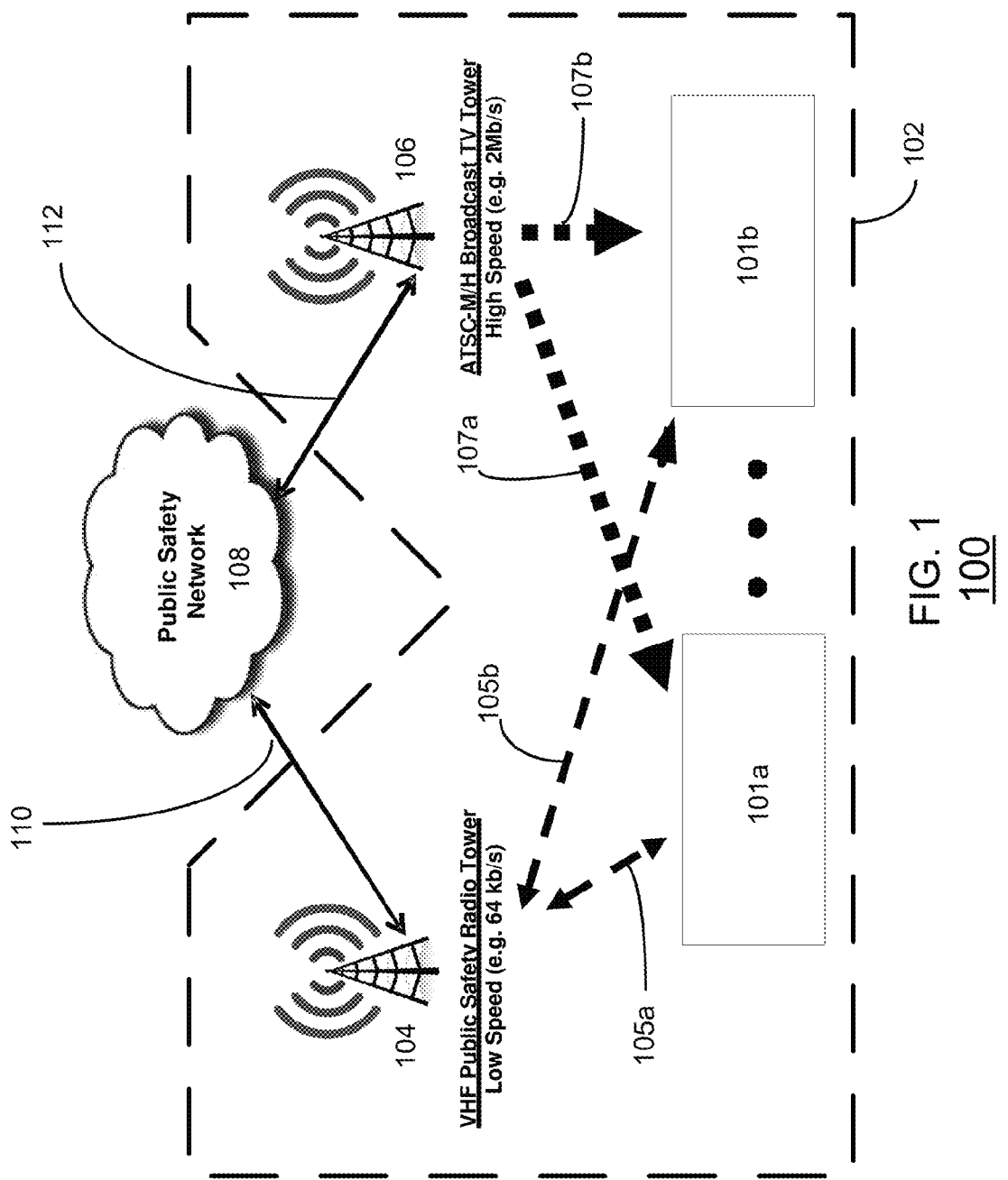
FIG. 1 shows an exemplary asymmetric broadband wireless public safety data network for supporting data communications with mobile stations in a geographic area in accordance with an embodiment of the invention.

The invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Embodiments of the invention describe systems and methods for providing a long-range asymmetric broadband data network. In particular, the data network is provided by combining use of a low data rate two-way wireless data network and a high data rate broadcast data network. In operation, data requests are received via the low data rate wireless data network and the corresponding data can be transmitted via either network according to one or more criteria. In order to provide robust, long range communications, the data networks are selected to support long range communications (tens of miles) over a large coverage area. For example, very-high frequency (VHF) or ultra-high frequency (UHF) data channels or bands in the range of 30 Hz to 3 GHz can be reliably used to support both low data rate and high data rate communications over a long range (>20 miles). Use of such long range networks permits implementation of a broadband data network using relatively few RF resources as compared to public cellular networks. This can make use of such long range networks especially attractive in rural areas.

In one embodiment of the invention, asymmetric wireless broadband data network architecture for public safety and first responder use is provided. In particular, use of a RF public safety channel can be combined with use of a broadcast service supporting data transmission at relatively higher data rates. For example, the network can use a portion of an ATSC-M/H (Advanced Television Systems Committee—Mobile/Handheld) TV broadcast signal having a high data rate (>500 kb/s) combined with a low data rate channel (9-64 kb/s) operated over a 25 kHz portion of the public safety VHF or UHF band. In operation, queries are received over the public safety band and responses are transmitted over the safety band of the ATSC-M/H broadcast signal. Application(s) and/or equipment in the requesting mobile station(s) and/or a supporting public safety computer network routes the traffic appropriately.

ATSC-M/H is the latest version of the signal for TV broadcasting in the United States, particularly the A153 standard ATSC M/H offers several enhancements over previous ATSC standards and takes advantage of advances in digital video compression technologies. For example, a high definition video program encoded and transmitted at a data rate of 14 Mb/s using previous ATSC standards can now be encoded and transmitted in 8-12 Mb/s. Accordingly, the use of ATSC-M/H provides broadcasters with "extra" bandwidth in their licensed 19.4 Mb/s broadcast signal. As a result, this additional bandwidth can be used for auxiliary services, including public safety and first responder use.

Additional enhancements in ATSC-M/H also make it possible for mobile users to receive the broadcast signal with separately encoded broadcast data services. These separate services can have additional error correcting codes applied and can therefore be reliably received at a great distance and in adverse conditions (up to 12.5 dB more "headroom" than in broadcast signals transmitted using the previous ATSC standard.) Other enhancements include some complex signals called training sequences that that help an ATSC-M/H receiver provide a more robust and reliable signal. Additionally, the ATSC-M/H standard allows for a distributed broadcast architecture, where the use of repeaters is transparent to the users receiving the broadcast signal, including users at mobile stations. That is, any delays due to repeaters are minimized or eliminated. These new features in ATSC-M/H make it an ideal mechanism to provide highly reliable data services to moving public safety vehicles. Additionally, because the broadcast range of ATSC-M/H signals and public safety band VHF/UHF signals is comparable (>20 miles), a single public safety transmitting station and nearby ATSC-M/H broadcast tower could provide coverage over an area of thousands of square miles. This large coverage can be provided even if the coverage areas of the two stations only partially overlap. A exemplary network including a combination of an ATSC-M/H broadcast signal and a low data rate public safety band is shown in FIG. 1.

FIG. 1 shows an exemplary asymmetric broadband wireless public safety data network 100 for supporting data communications with mobile stations 101a, 101b in a geographic area 102 in accordance with an embodiment of the invention. As shown in FIG. 1, safety data network 100 includes at least first base station 104 configured to provide two-way communication using a low data rate channel over at least a portion of area 102. As used herein, the term "base station" refers to a communications device installed at a fixed location and used to communicate with other communications devices or a network via wireless or wireline communications links. For example, as shown in FIG. 1, first base station 104 is configured to operate using a public safety VHF or UHF channel or band to provide low data rate communications links 105a, 105b with mobile stations 101a and 101b, respectively. As previously described, use of public safety bands typically allows reliable low data rate communications (e.g., between 9.2 and 64 kb/s) over a long range (>20 miles). As used herein, the term "mobile station" refers to any transportable communications device used to communicate with a base station or other communications device via at least a wireless communications link.

Alternatively or in combination with the use of UHF/VHF public safety channels, communications links 105a, 105b can be established using other wireless channels. For example, the communications links 105a, 105b can be implemented using any number of short range wireless communication protocols, such as the family of 802.xx protocols defined by the Institute of Electrical and Electronics Engineers (IEEE). Additionally, communications links 105a, 105b can also be implemented using long-range wireless access technologies such as, for example, cellular, microwave, software defined radio (SDR) and/or WiMAX to communicate with the computer network 108. Cellular access technologies can include, for example, CDMA-1X, UMTS/HSDPA, GSM/GPRS, TDMA/EDGE, EV/DO, and next generation technologies as they emerge.

Although only one low data rate base station (104) is shown in area 102, the embodiments of the invention are not limited in this regard. In some embodiments, multiple base stations and/or repeating stations supporting low data rate communications can be provided in area 102. Similarly, although only two mobile stations (101a, 101b) are shown in area 102, the embodiments of the invention are not limited in this regard. The various embodiments of the invention can be configured to support communications with any number of mobile stations in area 102.

Safety data network 100 also includes at least second base station 106 configured to support at least one-way communications using a high data rate channel over at least a portion of area 102. As shown in FIG. 1, second base station 106 is configured to operate using an ATSC-M/H broadcast band to provide one-way communications links 107a, 107b with mobile stations 101a and 101b, respectively. As previously described, use of an ATSC-M/H broadcast band and associated features typically allows reliable high data rate communications (e.g., >500 kb/s) over a long range (>30 miles). Although only one high data rate base station (106) is shown in area 102, the embodiments of the invention are not limited in this regard. In some embodiments, multiple base stations and/or repeating stations supporting high data rate communications can be provided in area 102.

As previously described, base stations 104 and 106 can support communications over the same or different portions of area 102. However, to provide high data rate communications, mobile stations 101a, 101b needs to be in an area where the coverage areas of base stations 104 and 106 at least partially overlap. The term "coverage area", as used herein with respect to a base station, refers the geographic area over which the signal from the base station can be received. As described above, a coverage area for a base station operating in a VHF/UHF band can cover thousands of square miles.

As shown in FIG. 1, the first 104 and second 106 base stations can be communicatively coupled to public safety computer network 108 via backhaul communications links 110 and 112, respectively. Computer network 108 can be configured to process data requests received at first base station 104 from mobile units 101a, 101b and route transmit data to one of first 104 and second 106 base stations for transmission. Discussion of such routing and transmission will be described below in greater detail with respect to FIG. 4. Computer network 108 can be implemented in a centralized or distributed fashion to support processing of data requests. For example, computer network can comprise one or more computing systems, each configured to perform one or more tasks for fulfilling a data request. An exemplary computing system is shown below in FIG. 3. Furthermore, computer network 108 can also be connected to one or more other external computer networks (not shown) or external computing systems (not shown). Although the computer network 108 is shown in FIG. 1 as being located outside area 102, the various embodiment of the invention are not limited in this regard. In some embodiments of the invention, one or more portions of computer network 108 can be located within area 102, including at a location or proximate to a location of one of base stations 104, 106.

In the various embodiments of the invention, backhaul communications links 110, 112 can be wireless or wireline communication links to computer network 108. In the case of wire line communications, communications links 110, 112 can utilize, for example, xDSL, cable, or PSTN telephony interfaces for communicating to computer network 108, to name a few. In some embodiments, these interfaces can include hybrid technologies that support circuit-switched packet-switched communications. Alternatively, or in combination with wireline communications, the communications links 110, 112 can be implemented using any number of short range wireless communication protocols, such as the family of 802.xx protocols defined by the Institute of Electrical and Electronics Engineers (IEEE). Additionally, communications links 110, 112 can also be implemented using long-range wireless access technologies such as, for example, cellular, microwave, software defined radio (SDR) and/or WiMAX to communicate with the computer network 108. Cellular access technologies can include, for example, CDMA-1X, UMTS/HSDPA, GSM/GPRS, TDMA/EDGE, EV/DO, and next generation technologies as they emerge.

Figure 2:
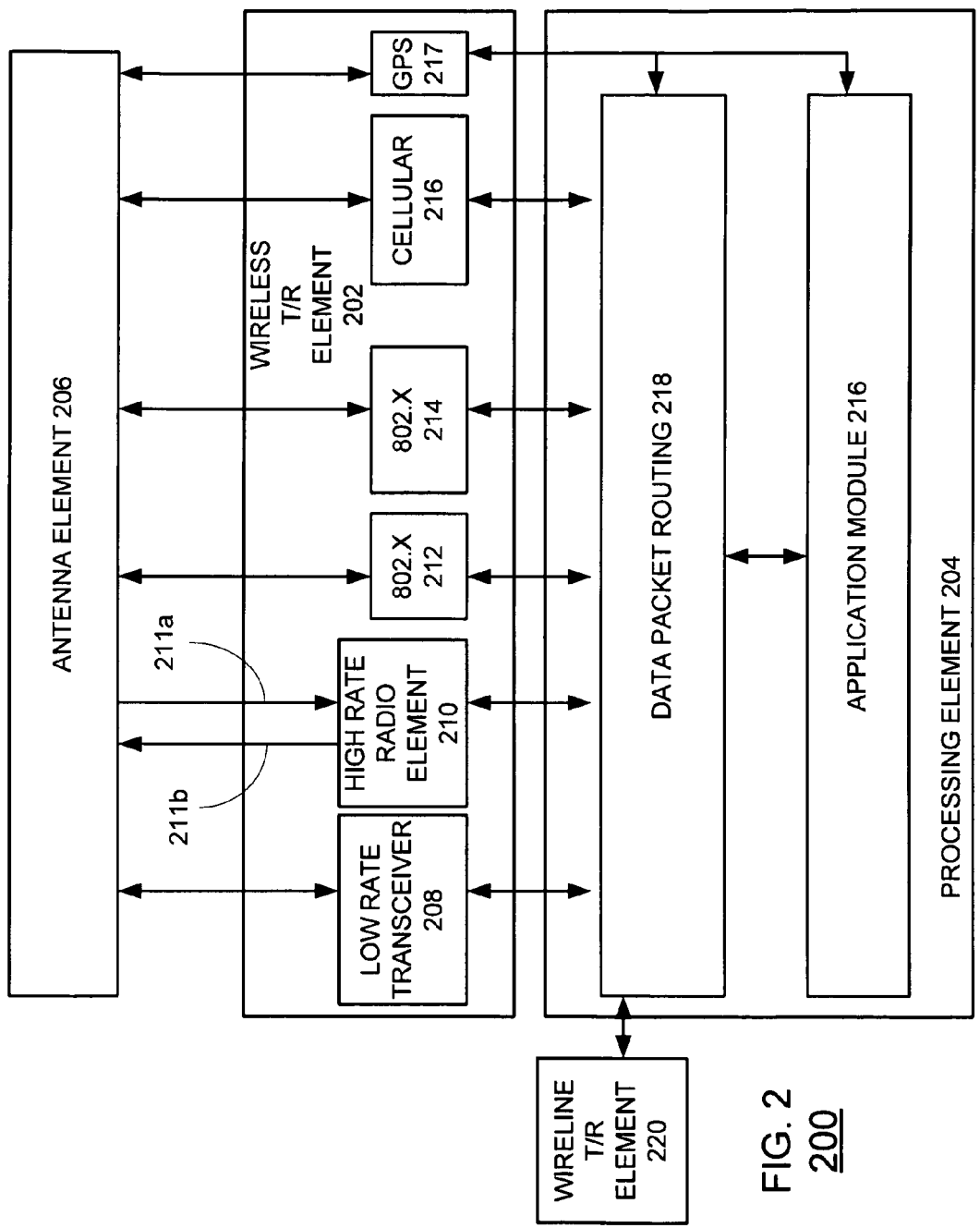
FIG. 2 shows an exemplary radio unit for operating in an asymmetric network configured in accordance with an embodiment of the invention.

FIG. 2 shows exemplary radio unit 200 for operating in an asymmetric network configured in accordance with an embodiment of the invention. The architecture shown in FIG. 2 can be used to implement a base station or a mobile station. In some embodiments of the invention, a base station or a mobile station may include more or less components than those shown in FIG. 2. The components described below, however, are sufficient to disclose an illustrative embodiment for practicing the invention.

The radio unit 200 can include a wireless transmit/receive (T/R) element 202, a processing element 204 coupled to the T/R element 202, and an antenna element 206 for the T/R element 202. In the various embodiments of the invention, these components of radio unit 200 can also be implemented in a centralized or distributed fashion. For example, the T/R element 202 can include one or more discrete or integrated components. Antenna element 206 can also include one or more separate antenna elements depending on the configuration of the T/R element 202. Additionally, one or more functions of the processing element 204 can be performed locally or remotely. For example, one or more processing tasks for a base station (104, 106) FIG. 1 can be performed within computer systems operating in computer network 108 and/or at the base station.

The components within the T/R element 202 can vary based on the application for the radio unit (mobile station, low data rate base station, high data rate base station). In the case of a mobile station, such as mobile stations 101a, 101b in FIG. 1, the T/R element 202 can include a low data rate transceiver 208 to support low data rate two-way communications. For example, transceiver 208 can be a public safety VHF/UHF transceiver for communication with a public safety band base station, such as first base station 104 in FIG. 1. The T/R element 202 for a mobile station can also include a high data rate radio element 210 to support at least one-way communications (via 211a and/or 211b) at a high data rate. For example, high data rate radio element 210 can be an ATSC-M/H receiver for receiving transmit data (via 211a) from an ATSC-M/H broadcast tower, such as second base station 106 in FIG. 1.

In the case of a low data rate base station, such as first base station 104 in FIG. 1, T/R element 202 can include low data rate transceiver 208 to support low data rate two-way communications. For example transceiver 208 can be a public safety VHF/UHF transceiver for establishing communications with one or more mobile stations, such as mobile stations 101a and 101b in FIG. 1. In the case of a high data rate base station, such as second base station 106 in FIG. 1, T/R element 202 can include high data rate radio element 210 to support transmission of at least one-way communications at a high data rate. For example, high data rate radio element 210 can be an ATSC-M/H broadcast transmitter for transmitting transmit data (via 211b) from an ATSC-M/H broadcast tower, such as second base station 106 in FIG. 1.

In some embodiments, T/R element 202 can also provide other interfaces for providing other means of wireless communication. For example, as shown in FIG. 2, one or more short-range wireless elements 212, 214 can be provided for establishing communications using any of the family of 802.xx protocols, as described above. Also as shown in FIG. 2, one or more cellular elements 216 can be provided for establishing communications using cellular access technologies, as described above. Such elements can also be used for emergency or backup communications or for providing one or more portions of a backhaul communications link for a base station. T/R element 202 can also include global positioning system (GPS) element 217 to generate location information for radio unit 200.

Processing element 204 can include application module 216 for generating data requests or processing transmit data sent and received via T/R element 202. The data requests and transmit data can be routed to a component of T/R element 202 via data packet routing element 218. Alternatively, data packet routing element 218 can route transmit or receive data to wireline transmit/receive element 220, such as a wireline communications link for backhaul communications links 110, 112 in FIG. 1.

Figure 3:
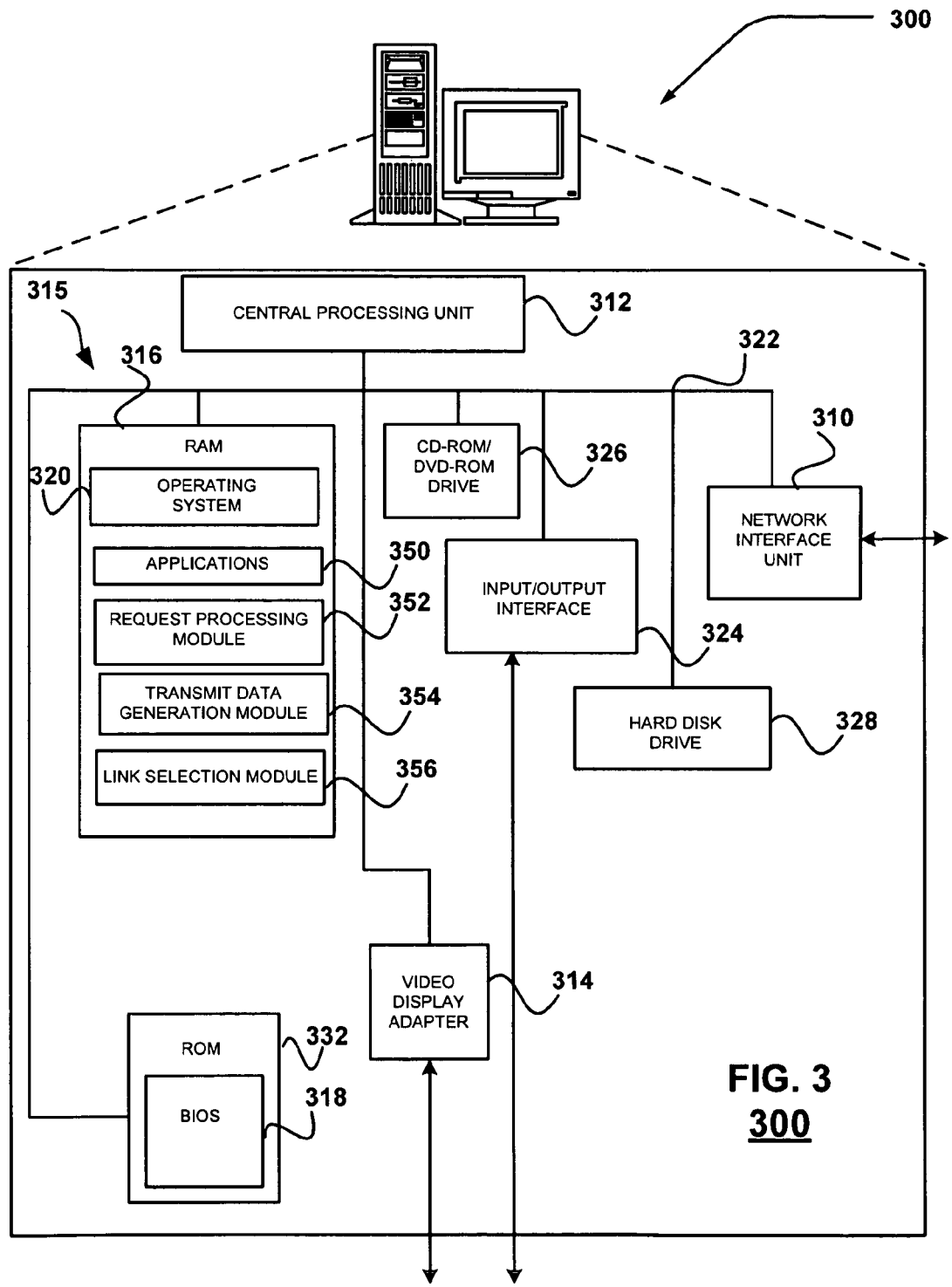
FIG. 3 shows one embodiment of a computing system for performing one or more tasks according to an embodiment of the invention.

FIG. 3 shows one embodiment of a computing system 300 for performing one or more tasks according to an embodiment of the invention. In some embodiments of the invention, a computing system used therein can include more or less components than those shown. The components described below, however, are sufficient to disclose an illustrative embodiment for practicing the invention.

System 300 includes processing unit 312, video display adapter 314, and a mass memory 315, all in communication with each other via bus 322. Mass memory 315 generally includes RAM 316, ROM 332, and one or more permanent mass storage devices, such as hard disk drive 328, tape drive, optical drive, and/or floppy disk drive. The mass memory stores operating system 320 for controlling the operation of system 300. Any general-purpose operating system can be employed. Basic input/output system ("BIOS") 318 is also provided for controlling the low-level operation of server 300. As illustrated in FIG. 3, server 300 also can communicate with the Internet, or other computer or communications networks, via network interface unit 310, which is constructed for use with various communication protocols including the TCP/IP protocol. Network interface unit 310 is sometimes known as a transceiver, transceiver device, network interface card (NIC), and the like.

Mass memory 315, as described above, illustrates a type of processor-readable storage media, which may include volatile, nonvolatile, removable, non-removable media, or any combination thereof. Mass memory 315 can be implemented in any method or technology for storage of information, such as processor readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device.

RAM 316 also stores program code and data. One or more applications 350 are loaded into RAM 316 and run on operating system 320. Examples of application programs include email programs, schedulers, calendars, web services, transcoders, database programs, word processing programs, spreadsheet programs, and so forth. RAM 316 can also include applications such as data request processing module 352, which can be configured to generate instructions for fulfilling data requests received from mobile stations. RAM 316 can further include modules that are useful for generating and transmitting data in response to such requests, such transmit data generation module 354 and transmit data routing module 358. Transmit data generation module 354 can be configured to execute the instructions generated by the data request processing module, including retrieval of data from one or more computer systems or networks. Transmit data routing module 358 can be configured to determine which communications link should be used to deliver the transmit data to the requesting mobile station, as will be described below with respect to FIGS. 4 and 5.

System 300 can also include input/output interface 324 for communicating with external devices, such as a mouse, keyboard, scanner, or other input devices not shown in FIG. 3. Likewise, system 300 can further include additional mass storage facilities such as CD-ROM/DVD-ROM drive 326 and hard disk drive 328. Hard disk drive 328 is utilized by system 300 to store, among other things, application programs, databases, data request processing module 352, transmit data generation module 354, transmit data routing module 358, and the like.

Figure 4:
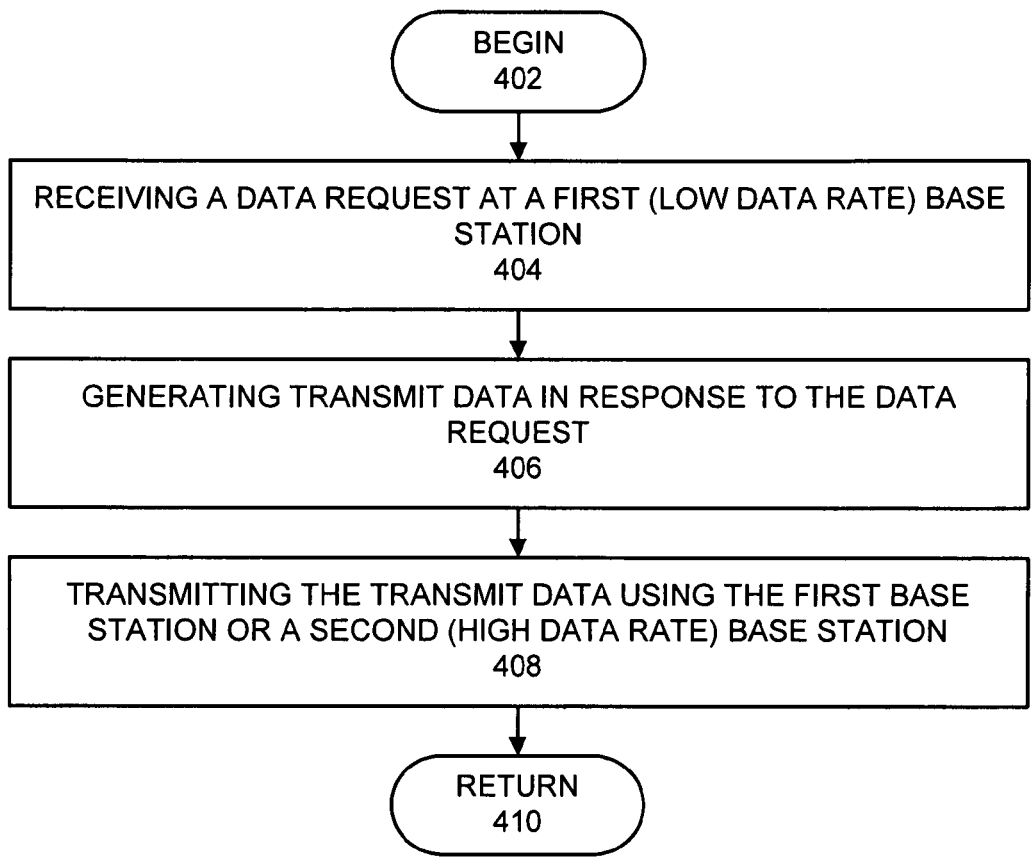
FIG. 4 is a flow diagram of steps in an exemplary method for processing data requests in an asymmetric wireless broadband data network configured in accordance with an embodiment of the invention.

FIG. 4 is a flow diagram of steps in an exemplary method 400 for processing data requests in an asymmetric wireless broadband data network configured in accordance with an embodiment of the invention. Method 400 can begin at block 402 and continue on to block 404. At block 404, a data request is received at a first, low data rate base station. More particularly, a data request is received via a low data rate communications channel associated with the first base station. For example, referring to FIG. 1, a data request from mobile station 101a can be received via a low data rate communications link 105a with first base station 104.

Once the data request is received at the first base station at block 404, transmit data in response to the data request is generated at block 406. As described above, upon receiving a data request at a first base station, the data request can be forwarded to a computer network for processing. For example, in the case of a data request from a public safety office(r) or a first responder at a public safety band base station, the data request is forwarded to a public safety computer network for processing. In the computer network, the data request can be analyzed and the appropriate instructions for fulfilling the data request can be generated, including a request for retrieval of data. The instructions can then be executed and the necessary information required for fulfilling the request and generating transmit data can be gathered from the computer network.

Once the transmit data is generated at block 406, the transmit data can be transmitted using the first or a second base station at block 408. In particular, a base station is selected and the transmit data is forwarded to the selected base station for transmission. Selection of a base station for transmission can occur according to one or more criteria. The selection of a base station is described below in greater detail with respect to FIG. 5. After the data request is transmitted at block 408, method 400 can resume previous processing at step 410.

In some embodiments, the transmit data can be formatted for the particular type of mobile station making the request. For example, the transmit data can be formatted for the size of the screen associated with the mobile station or to account for graphical or processing limitations of the mobile station. Alternatively, the transmit data can be divided into one or more subsets or sets of instructions for use by the mobile device to present the transmit data to the user. For example, the transmit data can include a data file indicating how different type of mobile stations can present the transmit data. In other embodiments, one or more data integrity features can be inserted into the transmit data. For example, encryption features or error correction features can be inserted into the transmit data.

Figure 5:
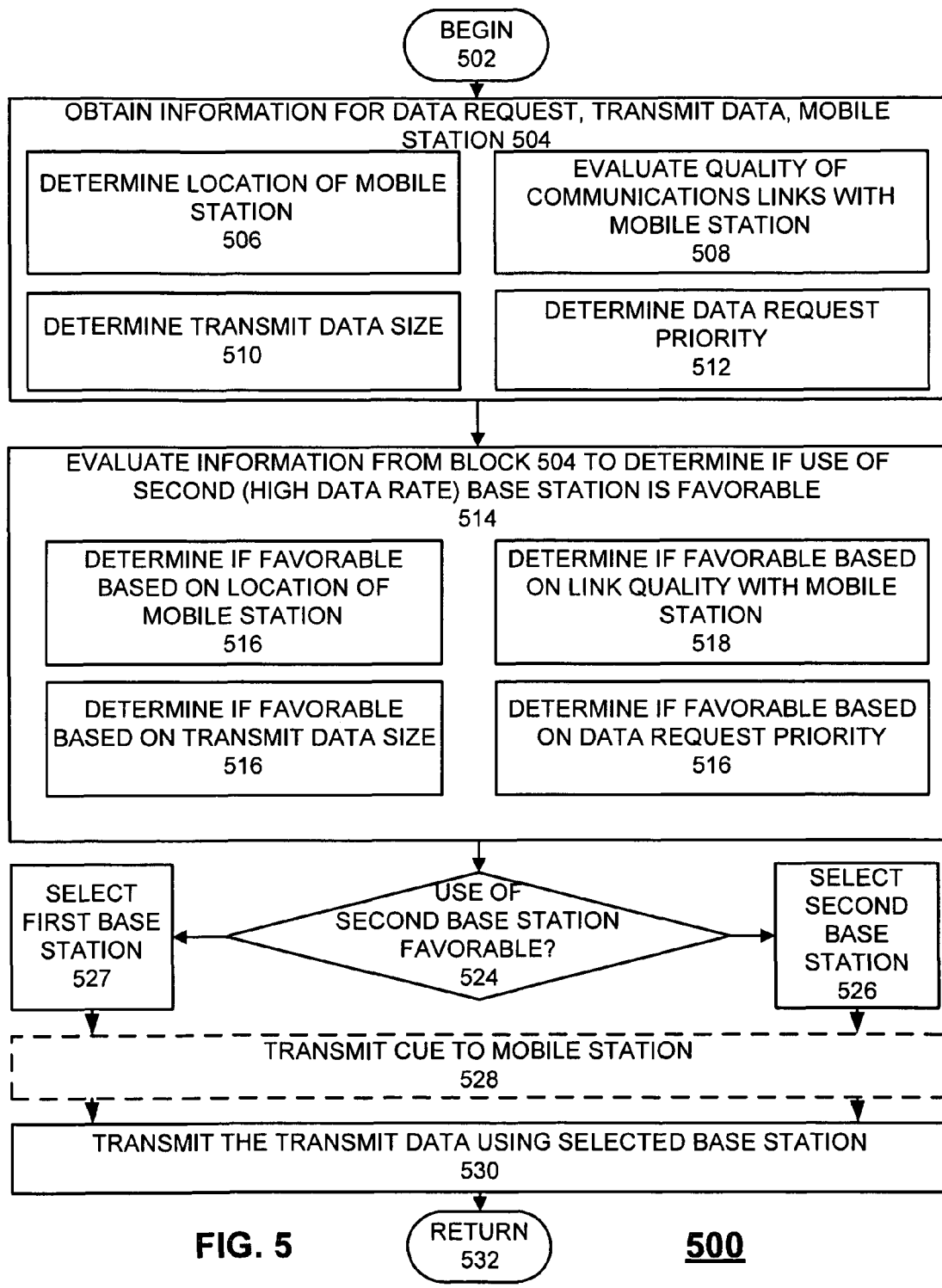
FIG. 5 is a flow diagram of steps in an exemplary method for selecting between a low data rate and a high data rate base station in an asymmetric wireless broadband data network configured in accordance with an embodiment of the invention.

As described above, selection of a base station for transmission of the transmit data can be based on one or more criteria. This selection process is illustrated in FIG. 5. FIG. 5 is a flow diagram of steps in an exemplary method 500 for selecting between a low data rate and a high data rate base station in an asymmetric wireless broadband data network configured in accordance with an embodiment of the invention. Method 500 can begin at block 502 and continue on to block 504.

At block 504, method 500 obtains information related to the data request received, the transmit data generated, and/or the mobile station. As shown in block 504, several types of information can be obtained. For example, at block 506, the location of the mobile station can be determined. Such a determination can be made using several methods, including, but not limited to, receiving GPS information from the mobile station or obtaining signal strength and directional information associated with the wireless signals comprising the data request. This information can be provided separately or in combination with the data request. However, the embodiments of the invention are not limited to these specific methods and any other methods for determining the location of a wireless mobile station can be used.

Alternatively or in combination with block 506, the quality of the communications link between the mobile station and the low and high data rate base stations can be determined at block 508. Such a determination can be made using several methods, including, but not limited to, retrieving signal strength data from the mobile station or evaluating the communications link based on test transmit data from both the low and high data rate base stations. However, the embodiments of the invention are not limited to these specific methods and any other methods for determining the quality of a communications link can be used.

Additionally, at block 510, the size of the transmit data resulting from the data request can be evaluated. Furthermore, at block 512, the priority of the data request can be evaluated. In the various embodiments of the invention, the priority of the data request can be specified within the data request, by the computer network, and/or any combination thereof. For example, the computer network can assign a priority to a data request based on the originating mobile station, the type of data request, or any combination thereof. However, the embodiments of the invention are not limited to these specific methods and any other methods for determining the priority of data request can be used.

Although only a few exemplary tasks are described above for block 504, the embodiments of the invention are not limited in this regard. In other embodiments, block 504 can include additional tasks for obtaining information related to the data request received, the transmit data generated, and/or the mobile station. Once the information is obtained at block 504, method 500 can proceed to block 514. At block 514, method 500 can evaluate the information obtained at block 504 to determine whether it is more favorable or advantageous to use the high data rate base station for the transmit data. This determination can be based on one or more criteria.

For example, at block 516, the computer network can determine use of the second, high data rate base station is more favorable if the mobile station is currently located within an area covered by a second, high data rate base station. This generally occurs when the mobile station is currently in an area where the coverage areas of the first base station receiving the request and the second base station coupled to the computer network overlap. For example, the computer network can determine whether a mobile station transmitting a data request to a public safety band base station is also currently within a broadcast range of an ATSC-M/H broadcast station coupled to the public safety computer network. Such a determination can be based on information provided by the mobile station, such as the GPS data obtained at block 506 or signal strength information obtained at blocks 506 and/or 508.

At block 518, the computer network can determine use of the second, high data rate base station is more favorable if communications link between the second base station is a high quality link based on the link information obtained at block 508. That is, if the high data rate communications link appears to be stable and can provide a higher data rate than the link via the first base station, the computer network can determine that it is more favorable to utilize the second base station. However, if high data rate communications link is poor, the computer network can determine that it is more favorable to continue using the first base station rather than risk loss of data.

At block 520, the computer network can determine use of the second base station is more favorable if the size of the transmit data is sufficiently large, based on the transmit data size information obtained at block 510. That is, if the transmit data size and the data rate via the first base station would result in an unreasonable amount of time for the mobile station to receive the transmit data, the computer network can determine that use of the second, high data rate base station is more favorable. Alternatively, if the size of the transmit data suggests that use of the first base station would not result in an unreasonable amount of time for the mobile station to receive the transmit data, the computer network can determine that the first base station is sufficient and that use of the second rate base station is not favorable or advantageous. Such a determination can also allow computer network to manage the load on the second base station.

At block 522, the computer network can determine whether use of the second base station is favorable based the priority of the data request obtained at block 512. For example, based if the priority of the data request is sufficiently high, the computer network can determine that a delay in the receipt of the transmit data is unacceptable and that the transmit data should be transmitted via the second, high data rate base station. Such a determination can also allow the computer network to manage use of the second base station. For example, second base station use can be reserved for specific types of data requests, users, or circumstances.

Although only a few examples of evaluating information related to the data request received, the transmit data generated, and/or the mobile station are provided, the embodiments of the invention are not limited in this regard. In other embodiments of the invention, other methods of evaluating such information for determining whether use of a high data rate base station is more favorable can also be used. Additionally, the determination of whether use of a high data rate base station is more favorable can be based on any combination of evaluations. For example, only a portion of the methods described above can be used. In another example, the results of the various evaluations within block 514 can be weighted according to their importance. Accordingly, even if many of the evaluations in block 514 suggest use of the high data rate base station is not favorable, the other evaluations, more heavily weighted, can result in an overall determination that use of the high data rate channel is more favorable.

After the determination at block 514 is made, method 500 can proceed to block 524. At block 524, if the result of block 514 is that use of the second base station is more favorable, method 500 proceeds to block 526 to select the second, high data rate base station for transmitting the data and continues to block 528 or block 530. Otherwise, method 500 proceeds to block 527 to select the first, low data rate base station for transmitting the data and continues to block 528 or block 530.

In some embodiments of the invention, the mobile station can be configured to listen for transmit data on both the low and high data rate channels associated with the low and high data rate base stations, respectively. In such embodiments, after a base station is selected at one of blocks 526 and 527, method 500 proceeds to block 530 to transmit the transmit data using the selected based station. However, in other embodiments of the invention, a cue for a mobile station can be generated at block 528. That is, a cue message is transmitted to the requesting mobile station indicating which channel (i.e., which base station) will be used to fulfill the data request. Such a cue message can be transmitted any of the base stations. Afterwards, the transmit data can be transmitted using the selected base station at block 530 and method can resume previous processing at block 532.

In some cases, even if the second base station is unavailable, the computer network can determine that it would be impractical to transmit a particular set of transmit data via the first base station. Therefore, in some embodiments, the computer network can delay transmission of the transmit data. In particular, if the second base station is selected at block 526 and the second base station is unavailable at block 530, the computer network can wait until the mobile station is in a coverage area of the second base station to complete block 530.

Figure 6:
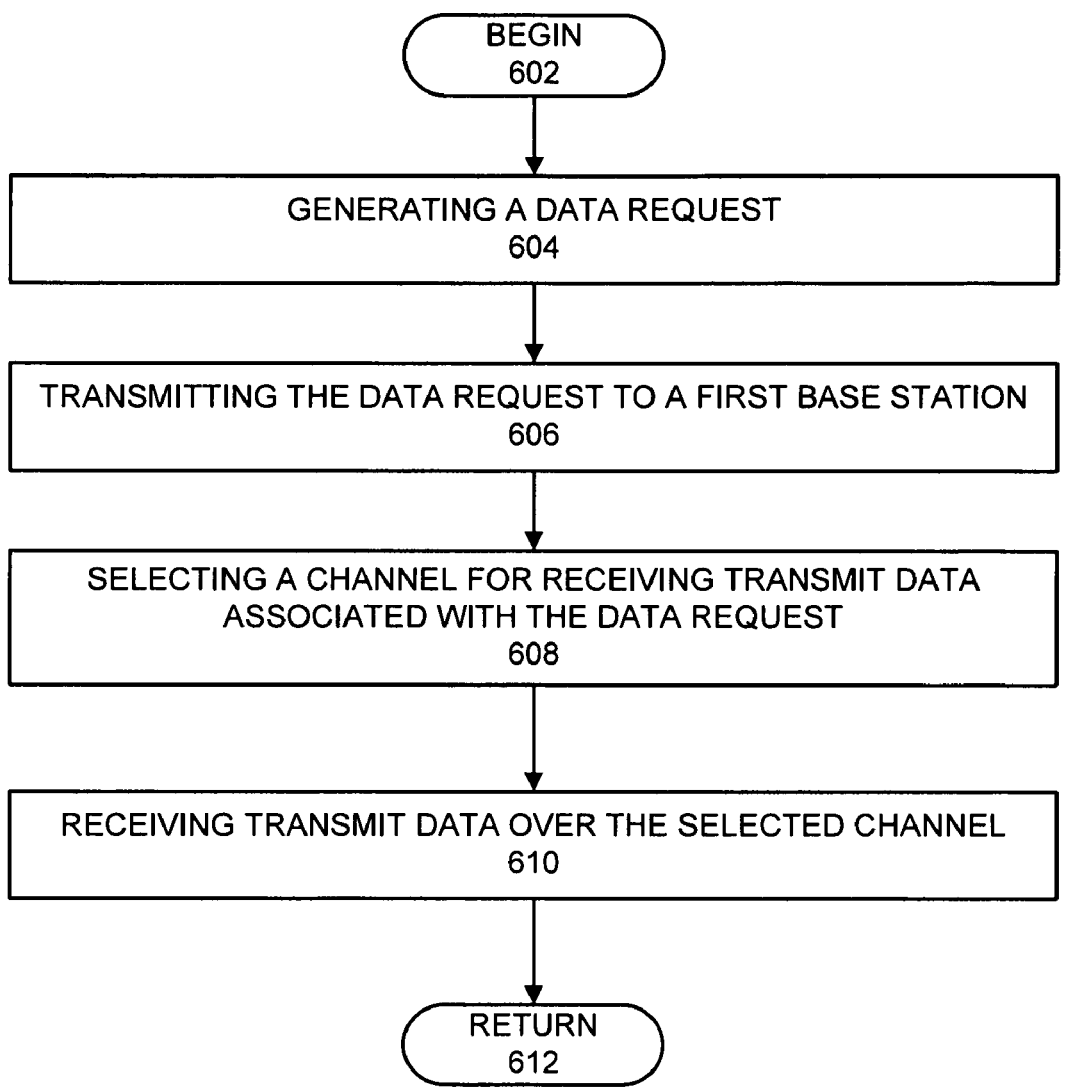
FIG. 6 shows a flow diagram of steps in an exemplary method for operating a mobile station in an asymmetric wireless broadband data network configured in accordance with an embodiment of the invention.

In the embodiment described above in FIG. 5, the decision of whether to utilize the low data rate base station or the high data rate based station is made by the computer network managing the base stations. However, in other embodiments, the decision can be made at the mobile station, as previously described. For example, FIG. 6 shows a flow diagram of steps in an exemplary method 600 for operating a mobile station in an asymmetric wireless broadband data network configured in accordance with an embodiment of the invention. Method 600 can begin at block 602 and continue on to block 604.

At block 604, the mobile station can generate a data request for the computer network. Afterwards, at block 606, the mobile station can transmit the data request. As previously described, data requests are transmitted by the mobile station using a low data rate communications link. For example, referring to FIG. 1, mobile station 101*a* would transmit a data request over communications link 105*a* to first base station 104 configured for low data rate communications.

Once the data request is transmitted at block 606, the mobile station can select, at block 608, the channel to be used for receiving the transmit data associated with the data request. As described above, in some embodiments, the mobile station can be configured to monitor both the low and high data rate channels. Accordingly, once the transmit data is detected on one of these channels, the mobile station can configure itself to collect and process the transmit data using the detected channel. Also as described above, the mobile station can select the channel based on a cue, as described above. Therefore, responsive to the cue, the mobile station can monitor the channel identified in the cue for the transmit data.

However, in some embodiments, the mobile station itself can specify to the computer network which channel should be used for the transmit data. For example, for certain types of data requests, the size of the transmit data fulfilling the request is known to be large, as described. Accordingly, for such data requests, the data request can specify that the transmit data should be provided via a high data rate channel. In another example, if the mobile station detects the availability of a high data rate base station, the mobile station can be configured to specify, separately or in combination with a data request, that transmit data should be delivered via the available high data rate channel. In some cases, these methods can be combined. For example, even if a data request specifies that use of a low data rate channel is acceptable, the mobile station can specify that if a high data rate channel is available for use, this high data rate channel should be used instead. Alternatively, the mobile station can specify that a particular data request should only be fulfilled when a high data rate channel is available. For example, for large transmit file sizes, the mobile station can specify that the transmit data should be transmitted only when the mobile station is in a high data rate coverage area. These methods of specifying the data channel are presented by way of example and not limitation. Accordingly, any other methods for specifying at the mobile station the data channel to be used can be used in the various embodiments of the invention.

Referring back to FIG. 6, once the channel is selected by the mobile station at block 608, the mobile station can listen and receive the transmit data over the selected channel at block 610. Afterwards, method 600 can continue on to block 612 to resume previous processing. For example, method 600 can be repeated to transmit and fulfill additional data requests.

Although the various embodiments of the invention have been described using the combination of an ATSC-M/H broadcast service and a RF public safety channel, this particular combination has been presented solely for illustrative purposes. In other embodiments, any type of low data rate communications channels (e.g., UHF/VHF channels other than public safety channels and signals outside the 30 Hz-3 GHz range) can be combined with any type of broadcast service supporting higher data rate communications (e.g., digital radio and other digital television formats) to provide an asymmetric network.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. An asymmetric wireless network, comprising:
   at least a first base station comprising a radio frequency (RF) transceiver having a first transmission range, a first transmit data rate, and a first coverage area;
   at least a second base station comprising an RF transmitter having a second transmission range, a second transmit data rate, and a second coverage area, the second transmit data rate being greater than the first transmit data rate, and the first and the second coverage areas at least partially overlapping;
   at least one computer network communicatively coupling the first and the second base stations; and
   at least one processor in communication with the computer network, wherein the at least one processor is configured to
   (1) receive a data request comprising a request to deliver response data to a mobile station located inside the first coverage area and inside the second coverage area, the mobile station having a first active bidirectional connection to the first base station over which the data request is communicated and having a first active uni-directional connection with the second base station,
   (2) generate response data in response to a reception of the data request,
   (3) obtain first information defining a plurality of criteria relating to communication performance,
   (4) evaluate the plurality of criteria in accordance with a predetermined level of importance assigned to each criteria relative to all other said plurality of criteria;
   (5) select a transmission path from among a plurality of transmission paths based on the first information and results of the evaluation, said plurality of transmission paths including a first path comprising the first base station and a second path comprising the second base station,
   (6) cause a cue message to be routed to the mobile station via the first base station, the cue message indicating which transmission path was previously selected; and
   (7) cause the response data to be routed to the mobile station via the second base station, without terminating the first active bidirectional connection;
   wherein data requests and cue messages are exclusively communicated over the first active bi-directional connection.

2. The wireless network of claim 1, wherein the second base station comprises an RF broadcast service base station with one-way broadcast capability.

3. The wireless network of claim 1, wherein the first base station comprises an RF Public Safety base station with receive and transmit capability.

4. The wireless network of claim 1, wherein the processor is further configured to select the transmission path based on (i) a comparison of a quality of a first communications link between the first base station and the mobile station relative to a quality of a second communications link between the second base station and the mobile station, (ii) a file size of the response data, and (iii) a priority associated with the data request.

5. The wireless network of claim 4, wherein the priority associated with the data request is determined based on at least one member selected from the group consisting of (i) a request type of the data request, and (ii) a user associated with the mobile station.

6. The wireless network of claim 1, wherein the processor is further configured to select the transmission path based on a file size of the response data.

7. The wireless network of claim 6, wherein the processor is further configured to estimate an amount of time required to transmit the response data via the first path, and select said transmission path based on said estimate.

8. The wireless network of claim 1, wherein the processor is further configured to compare a quality of a first communications link between the first base station and the mobile station and a quality of a second communications link between the second base station and the mobile station, and to select said transmission path based on said comparison.

9. The wireless network of claim 1, wherein the plurality of criteria comprises (i) a priority value associated with the data request or the mobile station, (ii) a type identifier associated with the data request, (iii) a file size of the generated response, (iv) an evaluation of the link quality between the first base station and the mobile station, (v) an evaluation of the link quality between the second base station and the mobile station, and (vi) an evaluation of the traffic level in the second base station.

10. The wireless network of claim 1, wherein the processor is further configured to receive from the first base station at least one of location data or signal strength data originating from the mobile station, and wherein the plurality of criteria comprises the received data.

11. A method for exchanging data over an asymmetric wireless network including at least a first base station comprising a radio frequency (RF) transceiver having a first transmission range, a first transmit data rate, and a first coverage area, at least a second base station comprising a RF transmitter having a second transmission range, a second transmit data rate, and a second coverage area, and at least one computer network communicatively coupling the first and the second base stations, where the second transmit data rate is greater than the first transmit data rate, and the first and the second coverage areas are at least partially overlapping, the method comprising:
   receiving at least one data request at the first base station, the data request comprising a request for response data to be delivered to a mobile station located inside the first coverage area and inside the second coverage area, the mobile station having a first active bidirectional connection to the first base station over which the data request was communicated and having a first active uni-directional connection with the second base station;
   generating transmit data in the computer network in response to the data request;
   obtaining first information defining a plurality of criteria relating to communication performance;
   evaluating the plurality of criteria in accordance with a predetermined level of importance assigned to each criteria relative to all other said plurality of criteria;
   selecting a transmission path from a plurality of transmission paths based on the first information and results of said evaluating step, the plurality of transmission paths including a first path comprising the first base station and a second path comprising the second base station;

causing a cue message to be routed to the mobile station via the first base station, the cue message indicating which transmission path was previously selected, and routing the transmit data to the mobile station using the second base station, without terminating the first active bidirectional connection;

wherein data requests and cue messages are exclusively communicated over the first active bi-directional connection.

12. The method of claim 11, wherein the step of routing the transmit data further comprises selecting an RF broadcast service channel for transmission of the transmit data.

13. The method of claim 11, wherein the step of routing the transmit data further comprises selecting an RF Public Safety channel for transmission of the transmit data.

14. The method of claim 11, wherein the transmission path is selected based on (i) a comparison of a quality of a first communications link between the first base station and the mobile station relative to a quality of a second communications link between the second base station and the mobile station, (iii) a file size of the response data, and (iv) a priority associated with the data request.

15. The method of claim 11, wherein the transmission path is selected based on a file size of the response data.

16. The method of claim 15, wherein the transmission path is selected based on an estimation of an amount of time required to transmit the response data via the first path.

17. The method of claim 11, wherein the transmission path is selected based on a comparison of a quality of a first communications link between the first base station and the mobile station and a quality of a second communications link between the second base station and the mobile station.

18. The method of claim 11, wherein the transmission path is selected based on a priority associated with the data request, the priority being determined based on at least one member selected from the group consisting of (i) a request type of the data request, (ii) a user associated with the mobile station, and (iii) a value indicative of available transmission capacity in the second base station.

19. A mobile station, comprising:

a radio frequency (RF) transceiver configured to
transmit at least one data request to a first base station and
receive response data from at least one of the first base station associated with a first channel and a second base station associated with a second channel, the first base station being associated with a first transmit data rate and the second base station being associated with a second transmit data rate greater than the first transmit data rate;

a processing element communicatively coupled to the RF transceiver and configured to:
generate the data request;
cause the data request to be sent via the first base station;
obtain first information defining a plurality of criteria relating to communication performance;
evaluate the plurality of criteria in accordance with a predetermined level of importance assigned to each criteria relative to all other said plurality of criteria;
select one of the first and second channels for receiving the transmit data associated with the data request based on the first information and results of the evaluation;
cause a cue message to be routed to the mobile station via the first base station, the cue message indicating which of the first and second channels was previously selected; and
cause the response data to be routed to the mobile station via the second base station.

20. The mobile station of claim 19, wherein the second channel comprises a one-way RF broadcast service channel.

21. The mobile station of claim 19, wherein the first channel comprises a two-way RF Public Safety channel.

22. The mobile station of claim 19, wherein the processing element is further configured to select one of the first and the second base stations based on the quality of the communications link between the RF transceiver and the second base station by comparing a quality of a communications link between the first base station and the RF transceiver and the quality of the communications link between the second base station and the RF transceiver.

23. The mobile station of claim 19, wherein the processing element is further configured to (1) estimate a file size of the response data based on an analysis of the data request, and (2) select the second channel based on the file size of the response data.

24. The mobile station of claim 19, wherein the processing element is further configured to select one of the first and second channels based on a priority specified for the data request.

* * * * *